Oct. 14, 1930.　　S. W. ROWELL ET AL　　1,778,511
PROCESS OF OXIDIZING ACETALDEHYDE TO ACETIC ACID
Filed Sept. 20, 1928
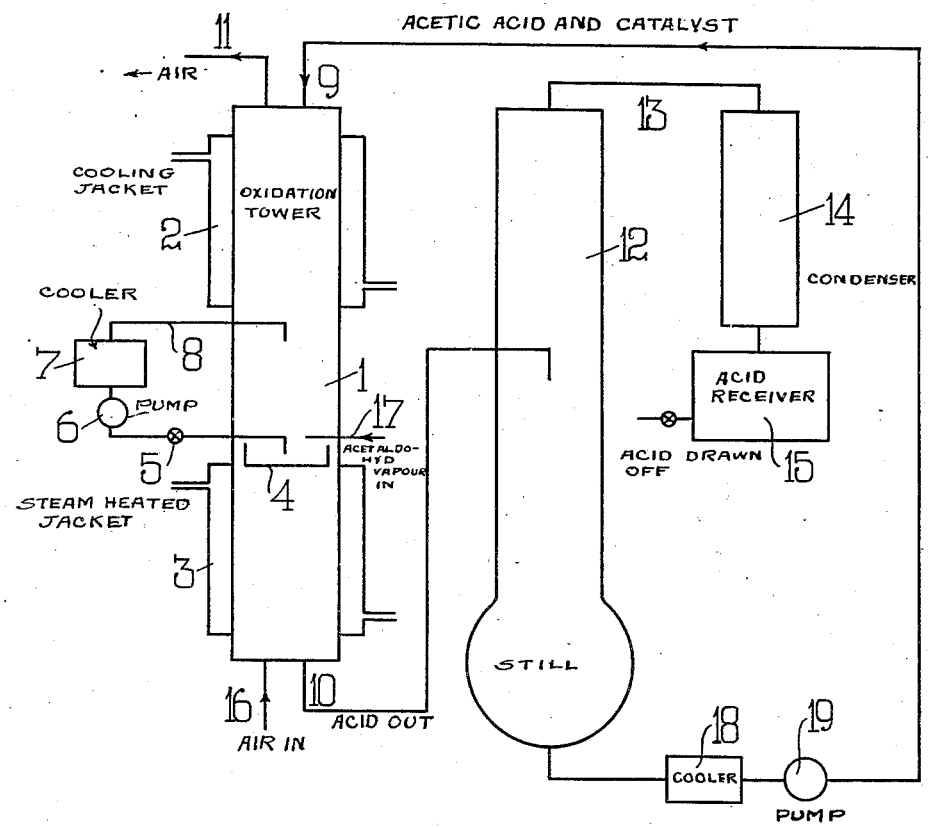

Patented Oct. 14, 1930

1,778,511

UNITED STATES PATENT OFFICE

SYDNEY WILLIAM ROWELL AND HERBERT SIM HIRST, OF NORTON-ON-TEES, ENGLAND, ASSIGNORS TO IMPERIAL CHEMICAL INDUSTRIES LIMITED, OF LONDON, ENGLAND, A BRITISH COMPANY

PROCESS OF OXIDIZING ACETALDEHYDE TO ACETIC ACID

Application filed September 20, 1928, Serial No. 307,197, and in Great Britain October 18, 1927.

This invention relates to a continuous process for the production of acetic acid by the oxidation of acetaldehyde by means of air or oxygen, and consist in performing the reaction in a medium of acetic acid, containing a suitable catalyst, which is supplied to the top of a column or tower and allowed to flow downwards in countercurrent to an ascending stream of acetaldehyde vapour and air or oxygen, the acetic acid solution withdrawn at the base of the column or tower being treated to separate an amount of the pure acid equal to the amount of acetalydehyde converted into acetic acid and to recover the solution containing the catalyst in its original concentration for use again in the process. Means are preferably provided for maintaining different sections of the tower at various predetermined temperatures, namely the top of the tower at a temperature between 17° C. and 20° C., the middle section of the tower at a temperature of about 30–50° C. and the lower section of the tower at a temperature of 90–100°. In this way the oxidation is localized in the middle section of the tower. A further feature of the invention consists in the close regulation of temperature in the oxidation section of the tower, by withdrawing liquor therefrom, circulating it at a regulable rate, cooling it if necessary, and returning it to the tower, preferably in the neighbourhood of the upper boundary of the oxidation section. The invention also includes the feature of carrying out the above described processes at pressures above the atmospheric, e. g. at pressures up to 5 atmospheres. Finally, the invention includes the use in the above-described processes of cobalt compounds as catalysts, or of cobalt compounds mixed with other well-known catalysts for oxidation of acetaldehyde to acetic acid.

An embodiment of the invention is shown in the accompanying drawing which is purely diagrammatic the tower or column 1 is packed with suitable filling material such as Raschig rings made of aluminium, and is provided at the top with a water-cooled jacket 2 and at the bottom with a steam-heated jacket 3. The top and bottom sections of the tower are thereby kept at temperatures of from 17–20° C. and 90–100° respectively, while the middle section of the tower is maintained at an intermediate temperature suitable for the oxidation reaction, which is generally from 30° to 50° C. Acetic acid containing a little dissolved catalyst (preferably 0.2 per cent. by weight of manganese acetate and 0.002 per cent. of cobalt acetate) is fed into the column at the top through the pipe 9, air is introduced at the base of the tower through the pipe 16 and acetaldehyde (preferably as vapour) is fed into the middle of the column by the pipe 17. The actaldehyde may be introduced at more than one point, and air may also be supplied in the same region. Unconsumed air passes off at 11.

The reaction takes place principally in the neighbourhood of the acetaldehyde inlet and develops a good deal of heat, so that in order to maintain the correct temperature some means of cooling must be provided. This may take the form of cooling coils arranged inside the column, but preferably we use the device illustrated in the diagram which consists in withdrawing a quantity of the tower liquor from a plate 4 and pumping it by a pump 6 through a cooler 7 and back to the column through the pipe 8. The amount of liquor so withdrawn is regulated by the valve 5, whereby the correct temperature is maintained within the middle section of the column.

The function of the lower section of the column is firstly to permit of the volatilization of any unchanged acetaldehyde, which is driven under the action of heat further up the column to the oxidation section, and secondly to destroy any peracetic acid that may have been formed during the oxidation. To some extent the peracetic acid is also destroyed by reaction with acetaldehyde in the lower section of the tower. The liquor withdrawn at the base of the tower represents therefore acetic acid free from acetaldehyde and peracetic acid, containing dissolved manganese and cobalt acetate. It is sent via the pipe 10 to a still 12, where an amount of acetic acid corresponding to the amount of acetaldehyde taken is distilled off and passed by a pipe 13 to a condenser 14, the liquid product being collected in the vessel 15. The unvaporized liquid in the still 12 represents the solution originally introduced into the reaction column, and it is returned thereto, after cooling in the cooler 18, by the pump 19.

The upper section of the column, which is cooled by the water jacket 2, acts firstly as a condenser for any acetaldehyde that may have escaped oxidation and ensures its return to the oxidation section, and secondly as a means of reducing the loss of acetic acid in the effluent air, since by keeping the temperature low the minimum of acetic acid is vaporized in the air current. The air passing off at 11 may be treated for the recovery of acetic acid, preferably by washing with a limited quantity of water as described in British Patent specification No. 310141.

With a view to facilitating the exchange of heat between the reaction tower liquor and the various cooling and heating means provided, the tower may be made of annular construction, the inner and outer walls then being available for heat transference, or the tower liquor may be distributed in the form of continuous films upon the walls of the tower.

We declare that what we claim is:—

1. A continuous process for the production of acetic acid by oxidizing acetaldehyde by means of an oxygen containing gas, in which the reaction is conducted in a medium of acetic acid containing a soluble catalyst comprising supplying said medium to a tower and allowing it to flow in countercurrent to a stream of acetaldehyde vapour, and an oxygen containing gas, continuously withdrawing the acetic acid at the foot of the tower, and continuously treating it to separate it into pure acid and an acid containing the catalyst which is then used again in the process.

2. A continuous process for the production of acetic acid by oxidizing acetaldehyde by means of an oxygen containing gas, in which the reaction is conducted in a medium of acetic acid containing a soluble catalyst comprising supplying said medium to a tower and allowing it to flow in countercurrent to a stream of acetaldehyde vapour, and an oxygen containing gas, continuously withdrawing the acetic acid at the foot of the tower, and continuously treating it to separate it into an amount of pure acid equivalent to the acetaldehyde oxidized and an acid containing the catalyst in concentration equal to the original medium, which is then used again in the process.

3. A continuous process for the production of acetic acid by oxidizing acetaldehyde by means of an oxygen containing gas, in which the reaction is conducted in a medium of acetic acid containing a soluble catalyst comprising supplying said medium to a tower and allowing it to flow in countercurrent to a stream of acetaldehyde vapour, and an oxygen containing gas, continuously withdrawing the acetic acid at the foot of the tower, and continuously treating it to separate it by distillation into pure acid and an acid containing the catalyst which is then used again in the process.

4. A continuous process for the production of acetic acid by oxidizing acetaldehyde by means of an oxygen containing gas, in which the reaction is conducted in a medium of acetic acid containing a soluble catalyst comprising supplying said medium to a tower and allowing it to flow in countercurrent to a stream of acetaldehyde vapor, and an oxygen containing gas, continuously withdrawing the acetic acid at the foot of the tower, and continuously withdrawing liquor from the central oxidation section of the tower, circulating same through a cooler and returning same to said tower.

5. A continuous process for the production of acetic acid by oxidizing acetaldehyde by means of an oxygen containing gas under pressure, in which the reaction is conducted in a medium of acetic acid containing a soluble catalyst comprising supplying said medium to a tower and allowing it to flow in countercurrent to a stream of acetaldehyde vapour, and an oxygen containing gas, continuously withdrawing the acetic acid at the foot of the tower, and continuously treating it to separate it into pure acid and an acid containing the catalyst which is then used again in the process.

6. A continuous process for oxidizing acetaldehyde to acetic acid in which the reaction is performed in a body of acetic acid of which part is removed and continuously circulated through an external cooling system.

7. Process for oxidizing acetaldehyde to acetic acid which consists in passing a gas mixture containing acetaldehyde and oxygen in countercurrent with a moving body of acetic acid circulated so that the flow of said body of acid is a multiple of the amount of acid produced by oxidation, withdrawing a quantity of acid at a rate which is a multiple of the rate of flow, and circulating said withdrawn acid through an external cooling system.

In witness whereof, we have hereunto signed our names this 7th day of September, 1928.

SYDNEY WILLIAM ROWELL.
HERBERT SIM HIRST.